Dec. 26, 1961 W. L. MARSHALL ET AL 3,014,980
INSULATION SYSTEMS
Filed April 13, 1959
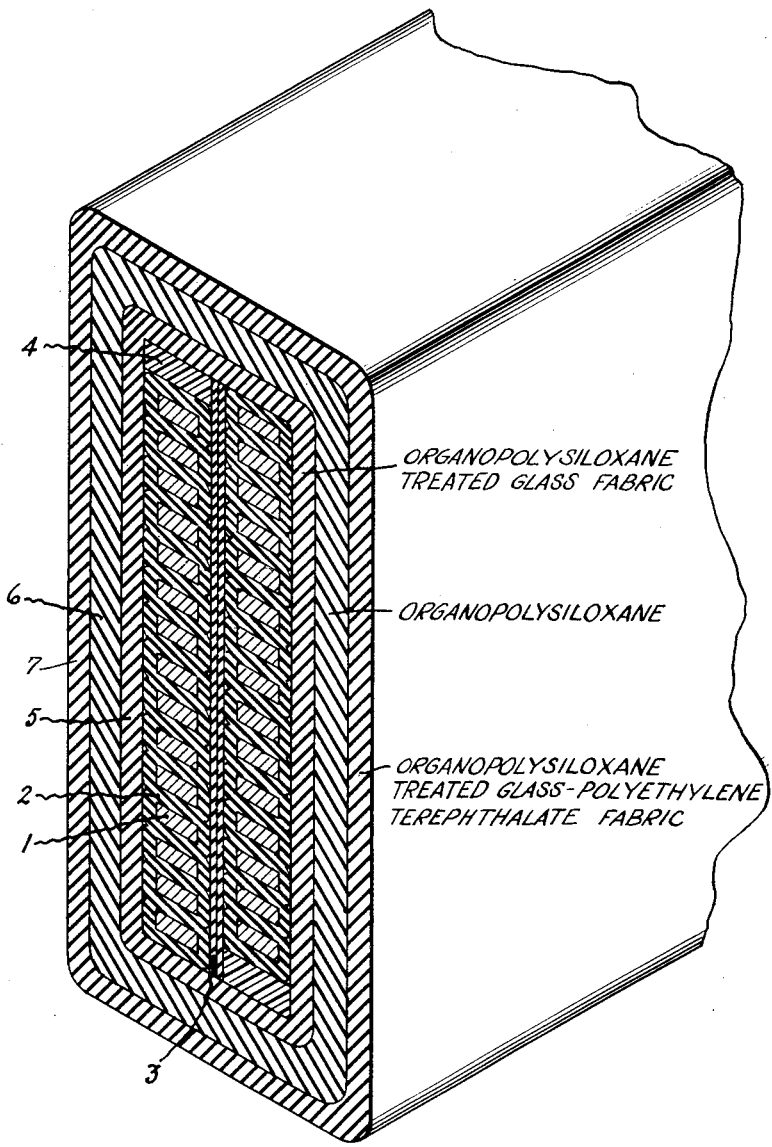
Inventors
Walter L. Marshall
John J. Keane
by  Kiess
Their Attorney United States Patent Office 3,014,980
Patented Dec. 26, 1961

3,014,980
INSULATION SYSTEMS
Walter L. Marshall, Schenectady, and John J. Keane, Guilderland, N.Y., assignors to General Electric Company, a corporation of New York
Filed Apr. 13, 1959, Ser. No. 805,953
2 Claims. (Cl. 174—121)

This invention relates to new and useful electrical insulating systems. More particularly, it relates to new insulating systems for electrical conductors and particularly for electrodynamic machine windings, said insulation system being characterized by improved electrical stress endurance relative to conventional organic resin-mica insulation systems. The systems are also characterized by superior corona resistance, excellent thermal characteristics and resiliency which decreases the tendency for tape migration and cracking due to different thermal expansions of the insulated conductor bar and the slot material of an electrodynamic machine.

Windings for electrodynamic machines are generally constructed of a plurality of conductor turns or strands or both insulated from each other and having a surrounding or outer ground insulation around the assembled strands. In alernating current machines, the individual conductors or strands, after coating with an insulating material, are placed together in transposed fashion with an insulating separator between each stack of conductors. When transposing the conductors to reduce skin effect, as, for example, by the Roebel process, the voids left in the bar periphery are filled by an insulating material.

A number of materials and insulation systems have been used for the outer insulation of such electrodynamic machine conductors, such insulation commonly being known as ground insulation. Among such ground insulation systems have been various combinations of mica tape impregnated with asphaltic or bitumen material. However, such ground insulation has a rather limited resistance to elevated temperature. Of particular interest for ground insulation are the organopolysiloxane or silicone materials which in general are characterized not only by good electrical insulating qualities but by resistance to high temperature. A ground insulation system utilizing organopolysiloxane material is described in Patent 2,789,155, April 16, 1957, assigned to the same assignee as this invention. In this patent there is set forth a ground insulation system comprising first, a layer composed of glass fiber tape coated and impregnated with organopolysiloxane and superimposed thereon a plurality of layers of organopolysiloxane containing tape comprising a backer material of a cured organopolysiloxane, said backer having thereon a substantially uncured organopolysiloxane composition having essentially non-reinforcing fillers. An outer insulating layer composed of organopolysiloxane coated and impregnated glass tape is placed over the insulation. While the above described organopolysiloxane insulation system is characterized by good electrical insulating qualities, when cured it produces a product of rather low physical strength and limited resistance to creep under load. It is also subject to a certain amount of chemical instability when exposed to moisture and temperature.

A principal object of this invention is to provide an insulating system for electrodynamic machine conductors which is characterized by good electrical qualities and superior physical qualities. Briefly stated, the invention comprises a ground insulation system consisting of a fabric tape coated and impregnated with a vinylpolysiloxane as described more fully hereinafter, superimposed upon which there is a layer of vinylpolysiloxane and a second layer of fabric coated and impregnated with vinylpolysiloxane, the entire insulation being used into a compact unitary mass.

The strand insulation or inter-strand insulation of electrodynamic machine conductors used in connection with the present invention may be chosen from a wide variety of materials so long as such materials are resistant to the temperatures of about 140° to 200° C. which are necessary to cure the ground insulation and more particularly the organopolysiloxane content of the ground insulation. A typical inter-strand insulation has as its resinous component epoxy resin compositions of particular characteristics. The epoxy resins in general are well known in the art. They are described in Castan U.S. Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2 propane. U.S. Patent Nos. 2,494,295; 2,500,600 and 2,511,913 describe further ethoxyline resins which can be used in conjunction with the invention. The above patents are incorpated herein by reference. The ethoxyline resins used herein have more than one epoxy group per molecule and can generally be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

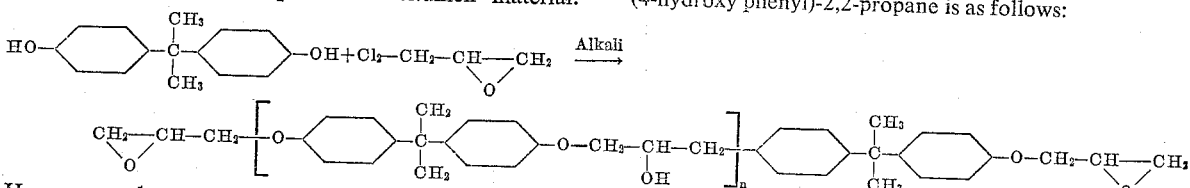

where $n$ has an average value ranging from 0 to about 7. Such ethoxyline resins are sold under the name of Epon by Shell Chemical Corporation, under the name Araldite by the Ciba Company, as Epi-Rez by Devoe-Raynolds Company and as ERL resins by the Bakelite Company. The data given below for epoxy resins is representative of such resins used herein, and it will be noted that they have epoxide equivalents ranging from about 175 to about 300, resins having epoxide equivalents outside this range being found to be in general not suitable for the purpose.

TABLE I

| Epoxy Resin | Epoxide Equivalent | M.P. ° C. |
|---|---|---|
| Epon 828 | 192 | Liquid. |
| Epon 824 | 225–290 | 20–28 |
| Epon 1310 | 220–225 | 77. |
| Araldite 6005 | 180–190 | Liquid. |
| Araldite 6010 | 192 | Do. |
| Araldite 6020 | 200–205 | Do. |
| ERL 2774 | 175–200 | Do. |
| Epi-Rez 510 | 175–200 | Do. |

The epoxy resin curing agents which have been found useful in the invention are those described in application Serial No. 691,173, October 1, 1957, now Patent 2,962,410, assigned to the same assignee as this invention included by reference herein. There are described in this application curing agents comprising a mixture of an organic nitrogen-containing base having at least one nitrogen atom per molecule and no more than one hydrogen atom on each nitrogen atom, said base containing no other reactive groups or groups which are reactive with the ethoxyline resin or the alkyl titanate, and an organic titanium ester. Examples of reactive groups include hydroxyl or carboxyl groups as well as multiple hydrogeneous atoms on nitrogen atoms. Representative examples of nitrogen-containing bases as set forth in the above application which is included herein by reference are amines such as piperidine, pyridine, dibutylamine, triethanolamine, tributylamine, morpholine, n-cocomorpholine, trimethylamine, diethylamine, dibutylamine, and derivatives of these amines. The titanates found useful are those of the general formula $Ti(OR)_4$, wherein R is a radical selected from the group consisting of the saturated and unsaturated aliphatic hydrocarbons, for example, methyl, ethyl, etc., and vinyl alkyl, etc., aralkyl, alkaryl, and cycloaliphatic radicals, among others.

Another type of curing agent found useful for the epoxy resins are the boron-trifluoride-organic base complex materials. These are well known in the art and are conveniently prepared by adding to an ether solution of base or amine as desired an ether solution of the boron-trifluoride-ether complex. They can also be prepared by simply bubbling fluorine solution or gas through an ether solution of a base. Preferably, alkyl ethers are used, such as methyl, ethyl, propyl, butyl, etc. or mixed alkyl ethers, as well as aryl ethers, esters, alkyl, alkaryl, and arakyl ethers. Among the amines which can be used are methylamine, ethylamine, propylamine, butylamine, aniline, diethyl aniline, toluidene, chloroaniline, nitroaniline, and piperidine. Also useful are complexes prepared as above of boron trifluoride with materials such as phenol and etherate complexes. Other suitable ethers and base materials will occur to those skilled in the art. A $BF_3$-ethylamine complex material is commercially available from the Shell Chemical Company and is known as BF3-400. From about 1.5 to 6 percent by weight of this material, preferably from 2.5 to 3.5 percent, based on the resin weight, is used.

In preparing the strand insulation or the insulation 2 on the individual conductor bars 1, usual insulating techniques are used which are well known to those skilled in the art. Normally, the wire is coated with epoxy resin varnish containing a curing agent, asbestos fibers, or other suitable fibrous materials are applied thereto, and these fibers are in turn impregnated with the epoxy resin varnish, any excess of epoxy resin being removed by wipers. Of course, preimpregnated tapes can also be used. The material is also heated to expel all volatile material such as solvent, but not to the extent that any curing of the strand insulation takes place. Typical epoxy resin solutions which have been found useful for this strand insulation are those comprising from about 10 to 20 percent Epon 1310, 60 to 80 percent Araldite 6010, 0.2 to 10 percent tetrabutyltitanate, 0.1 to 6 percent dimethyl soya amine, and 5 to 15 percent methyl ethyl ketone. Epon 1310 is the polyglycidyl ether of 1,1', 2,2'-tetrakis (hydroxyphenyl) ethane. A preferred epoxy resin solution for such use is one containing, by weight, 14 percent Epon 1310, 7.14 percent Araldite 6010, 4.3 percent tetrabutyl titanate, 1.5 percent dimethyl soya amine, and 8.8 percent methyl ethyl ketone. It will be realized, of course, that in place of the methyl ethyl ketone, any of the other well known solvents for epoxy resins may be used, so long as they are compatible.

The vertical separators 3 are readily made by impregnating an asbestos glass cloth of the usual type with an epoxy resin solution as by dipping, brushing, or application through coating rollers, the finished material again being completely dried but with no polymerization taking place. Typical epoxy resin solutions for vertical separator treatment are those containing, by weight, from about 35 to 65 percent Epon 1310, 10 to 20 percent Araldite 6010, 0.2 to 10 percent tetrabutyl titanate, 0.1 to 6 percent dimethyl soya amine, and 30 to 60 percent methyl ethyl ketone, while a specifically preferred material is one containing, by weight, 41.7 percent Epon 1310, 13 percent Araldite 6010, 2.7 percent tetrabutyl titanate, 1.1 percent dimethyl soya amine, and 41.5 percent methyl ethyl ketone. Other epoxy and polyester compositions, well known to those skilled in the art, can be used.

Whereas in D.-C. machines the entire conductor bar array is made up of conducting material or strands, in A.-C. machines it has been found desirable, as pointed out above, to transpose the strands by one means or another as, for example, in the Roebel transposition where there is accomplished a complete rotation of the respective strand positions throughout the conductor bar length. The voids or spaces produced in the vertical ends of the conductor bars indicated at 4 in the drawing, which were formerly filled with a shellac or asphalt impregnated fibrous material, are preferably filled with a so-called putty or filler which has as its base an epoxy resin as described in application Serial No. 743,691, filed June 23, 1958, now Patent 2,962,613, and assigned to the same assignee as this invention, said application being included herein by reference. It will be understood, of course, that the foregoing description of the strand insulation is typical only and for the purpose of presenting a specific type of such insulation. Other strand insulations which will fill the same purpose and be compatible with the ground insulation will occur to those skilled in the art, including other polyester and epoxy compositions, among others, either in conjunction with fibrous material or alone.

In order to assure a secure bond between the organopolysiloxane containing ground insulation and the conductor bar proper, the strands of which have been insulated with the epoxy resin or other composition as described above, a primer coat is preferably applied to the conductor bar, the resin for which has been cured by baking in excess of 150° C. for about 1 hour more or less. One such primer material contains about 1000 parts of toluene, from 250 to 1000 parts, by weight, of a vinylpolysiloxane such as those described hereinafter, up to about 10 parts of tertiary butyl perbenzoate and from about 10 to 50 parts, preferably from about 1 to 25 parts of bis(2,4-dichlorobenzoyl) peroxide. The coating of primer is dried at room temperature on the bar and then cured for one-half hour at about 135° C. It will be realized that this curing is of a time-temperature relationship and may be varied in manners well known to those skilled in the art. The primer above can be improved by adding about 100 parts by weight of vinyl triethoxy silane to the dispersion, such additional material improving the wetting and bond strength. Another primer which can simply be applied to the bar and allowed to cure for about 24 hours at room temperature comprises, by weight, about 5 parts of methyl silicone oil, about 1 part of vinyl triethoxysilane, 6 parts toluene and from 0.05 to about 0.15 part of tin octoate. Still a further primer which may advantageously be used is a 10 percent solution of polyvinyl formal in dioxane.

The first layer of the ground insulation proper is a so-called armoring layer which serves to prevent cutting of the overlying unsupported tape layers under impact or damaging due to possibly sharp edges of the strands which may occur particularly when the Roebel transposition has been carried out. This armoring layer 5 consists of an organopolysiloxane coated and impregnated glass fabric and can, in addition, if indicated, also include electrical grading material such as carbon, carbonaceous material, conductive compounds, metal, etc. The organopolysiloxanes which have been found particularly useful in connection with our invention are those described in copending application, Serial No. 680,438—Bobear, filed August 26, 1957, and assigned to the same assignee as this invention, and patent application Serial No. 619,675, filed November 1, 1956, now Patent 2,875,172, issued February 24, 1959, also assigned to the same assignee as this invention, the above referred to applications referring respectively to methylvinylpolysiloxane and to alkyl arylvinylsiloxanes. The methylvinylpolysiloxane is prepared typically by reacting octamethylcyclotetrasiloxane and tetramethyl tetravinylcyclotetrasiloxane in such proportions that the final polysiloxane gum contains about 0.2 mol percent vinyl groups on the polysiloxane chain with 0.001 percent, by weight KOH at a temperature of about 140° C. to 150° C. for four or five hours. One hundred parts, by weight, of this material are then doughmixed at 110° C. to 115° C. for one hour with 3 parts, by weight, diethylene glycol bis-(2-n-butoxyethyl)carbonate and 40 parts by weight finely divided silica filler. There is mixed in after doughmixing two parts, by weight, iron oxide filler and two parts, by weight, benzoyl peroxide. The methylvinyl compound so prepared is soluble in benzene and has an average of about two methyl groups per silicon atom. This methylvinylpolysiloxane is typical of those alkyl vinylpolysiloxanes described in application Serial No. 680,438, cited above, which is hereby included in this application by reference, this application covering generally such organopolysiloxanes convertible to the cured, solid, elastic state, having incorporated therewith a structure reducing additive comprising an organic carbonate in amounts equal to from about 0.05 to 10 percent, by weight, based on the weight of the convertible organopolysiloxane. Also useful in connection with the present invention are the alkyl aryl vinyl silicone elastomers set forth in application Serial No. 619,675, now Patent 2,875,172, cited above, also included herein by reference. Such alkylarylvinylpolysiloxanes can typically be made, for example, by mixing octamethylcyclotetrasiloxane in the amount of 100 parts, by weight, with 15 parts of octaphenylcyclotetrasiloxane and heating to about 130° C., thereafter adding 0.023 part 1,3,5,7-tetramethyl-1,3,5,7-tetravinyl cyclotetrasiloxane to the mixture with about 0.01 percent, by weight, KOH, based on the total weight of the organopolysiloxanes, the mixture then being heated for about 5 hours with stirring at 165° C. to 175° C. The KOH is then neutralized as with trichloroethyl phosphite at 175° C. and devolatilized to produce a methyl phenyl silicone containing an average of about two organic groups to each silicon atom. This material is typically mixed in the amount of 100 parts, by weight, with about 4 parts of diphenylsilanediol, and about 40 parts of finely divided silica over a period of about 2½ hours to insure smooth and complete blending of the filler with the polmer mix, this mixing being accomplished in a Banbury mixer, doughmixer or equivalent apparatus at a temperature of about 140° C. to about 180° C. After cooling to room temperature, one part of bis-(2,4-dichlorobenzoyl) peroxide is added while mixing on a rubber mill. The glass fiber fabric which is used as the armor layer is simply coated and impregnated with either of the two above types of organopolysiloxane as desired, or mixtures thereof. Preferably, the fabric is first primed with the below described vinyltriethoxy silane-glycol reaction product. Preferably, the tape is butt lapped although, of course, any other type of lapping can be used.

There is added over the armor layer 5 a layer 6 comprising a plurality of turns or plies of unsupported organopolysiloxane tape. This tape consists of two components, a so-called backer which is fully cured in the usual way, and a so-called adhesive layer of organopolysiloxane which is semi-cured in manners well known to those skilled in the art. This layer can be graded electrically, if desired, by the use of conductive or semi-conductive material as above. It has been found again that the above described organopolysiloxanes are most useful for this purpose, either one being used as the backer with the other being used as the adhesive. The tape is formed in manners which are well known to those skilled in the art, typically being formed on calender rolls with or without a thin film carrier, as required. The backer is formed first and is cured, after which the adhesive material is applied in a semi-cured condition to the backer. Using the methylvinylpolysiloxane described above as a fully cured material and the methyl phenylvinylpolysiloxane material described as an adhesive in the semi-cured condition for a tape 15 mils in thickness, there was obtained a tensile strength of 886 lbs. per sq. inch, an elongation of 325 percent, and a tear strength of 99 lbs. per inch. This is as compared to a typical prior art material having a thickness of 13 mils with a tensile strength of only 235 lbs. per sq. inch, an elongation of 300 percent, and a tear strength of only 23.4 lbs. per inch. Using the methyl phenylvinylpolysiloxane as a fully cured backer with the methyl vinylpolysiloxane as the semi-cured adhesive in a tape 13 mils thick, there was obtained a tensile strength of 600 lbs. per sq. inch, an elongation of 750 percent, and a tear strength of 108 lbs. per inch. The tape so prepared is simply wrapped around the conductor to the desired thickness typically with a half lap joint.

The insulating materials of the invention are particularly resistant to reversion or return to a shapeless mass. For example when the present materials were placed in an oven at 160° C. which was cycled to room temperature over each weekend and then back to 160° C., there was no evidence of reversion even after eight months of such testing.

Over the layer 6 of unsupported silicone tape there is applied a layer 7 of glass-polyethylene terephthalate tape, the glass yarns constituting the fill of the tape and the polyethylene glycol terephthalate the warp thereof. This tape is coated and impregnated with an organopolysiloxane such as either of those described above, the glass fabric being first primed with a primer obtained by interacting at least 2½ mols of ethylene glycol with 1 mol of a material consisting essentially of vinyl trialkoxysilane, the alkyl group of the alkoxy radical being the residue of a monohydric alcohol containing from 1 to 5 carbon atoms, there being present more than one hydroxy group of the ethylene glycol for each alkoxy group in the mixture of alkyl alkoxysilanes and thereafter heating the mixture of ingredients at a temperature below 100° C. while removing liberated aliphatic monohydric alcohol. Such materials are described in application Serial No. 74,983, filed November 19, 1958, now Patent 2,974,063, and assigned to the same assignee as this invention the disclosure of this application being included herein by reference. Typically, a mixture of 0.950 vinyl trialkoxysilane and 0.05 mol of methyltrichlorosilane is added over a period of about 10 minutes to 9 grams of violently agitated isopropyl alcohol in a suitable container. Then to the resultant acidic reaction mixture there is added about 3 mols of ethylene glycol over a period of 10 minutes. The system is then arranged for vacuum stripping under water aspiration, such stripping being continued until the container temperature reaches 100° C. The resultant homogeneous mixed solution is then neutralized with calcium carbonate mixed with finely divided silica and fuller's earth and filtered to produce 192 product grams of final product which is then adjusted with respect to acidity by the addition of acetic acid up to a concentration of 0.5 percent, by weight, based on the weight of the resin. The primer solution consists typically of a 10 percent water solution the fabric being merely dipped in the solution, air-dried and baked for about 10 minutes in 150° C., followed by a 10 minute bake of 250° C. There is calendered to the primed glass fabric either the methylvinylpolysiloxane gum composotion or the methylphenylvinylpolysiloxane composition as described above. Typically, the armored tape is butt or half lapped around the periphery of the insulated conductor bar to the thickness desired. As with the other components of the present ground insulation electrically grading material can be used as desired to obtain well known effects.

The entire insulating system is cured by heating at temperatures ranging from about several minutes to about four hours at temperatures ranging from about 125° C. to about 200° C. at pressures of from about 15 p.s.i. to 100 p.s.i. It will be realized that the curing cycle is of a time-temperature-pressure nature, variations in any of the parameters requiring corresponding changes in the other curing conditions. A post cure of about one hour at about 150° C. followed by a cure of from about four to forty-eight hours at 200° C. is also preferred. It will be realized that this treatment can also be varied.

The physical and electrical characteristics of ground insulation as set forth herein are outstanding at elevated temperatures as well as at room temperature. Shown in Table II below are the 60 cycle power factor and dielectric constant of the present system at various temperatures which illustrate its desirability.

TABLE II

| Temperature (° C.) | Power Factor (percent) | Dielectric Constant |
|---|---|---|
| 30 | 0.8 | 3.0 |
| 60 | 0.8 | 2.9 |
| 80 | 1.0 | 2.8 |
| 100 | 1.6 | 2.65 |
| 120 | 3.0 | 2.60 |
| 140 | 5.2 | 2.55 |
| 160 | 3.6 | 2.50 |
| 170 | 3.6 | (1) |

[1] Not Tested.

The present system even when tested at 150° C. as compared to only 25° C. for the usual asphalt-mica insulation is far superior under dielectric stress. An asphalt mica system failed in about 300 hours under a dielectric stress of 200 volts per mil whereas under life stress the life of the present insulation at 150° C. was over 2000 hours.

While the relative thicknesses of the various layers of the present insulation can be varied to suit any particular needs in a typical system such as that tested above, the inner armor layer is typically about 15 mils thick, the unsupported silicone layers about 135 to 155 mils thick and the outer armor layer about 30 mils thick for a total thickness of about 200 mils per side.

There are provided by the present invention insulation systems for electrical conductors which are characterized by good electrical qualities and rugged physical features. Their resiliency obviates the tape or insulation migration present in the usual systems. Their improved thermal capability permits operation at higher temperatures and facilitates the production of machines of higher capacity. They are characterized by improved heat transfer and resistance to reversion of their components under high temperatures.

What we claim as new and desire to secure by Letters Patent of the United States is:

1. An insulating system for electrical conductors comprising successively over said conductor (1) a layer of glass fabric tape primed with the reaction product of vinyl triethoxy silane and ethylene glycol and coated and impregnated with an organopolysiloxane selected from the class consisting of alkyl vinyl polysiloxane and alkyl aryl vinyl polysiloxane, (2) a layer of unsupported organopolysiloxane comprising a backer selected from the class consisting of filled alkyl vinyl polysiloxane containing an organic carbonate and filled alkyl aryl vinyl polysiloxane and an adhesive layer selected from the group consisting of filled alkyl vinyl polysiloxane containing an organic carbonate and filled alkyl aryl vinyl polysiloxane and (3) a layer of fabric tape woven from glass fibers and polyethylene terephthalate fibers, said tape being primed with the reaction product of vinyl triethoxy silane and ethylene glycol and coated and impregnated with an organopolysiloxane selected from the class consisting of alkyl vinyl polysiloxane and alkyl aryl vinyl polysiloxane, said insulating system being cured to a unitary mass.

2. An insulating system for an electrical conductor as in claim 1, said layer (1) containing an electrically semi-conductive material.

References Cited in the file of this patent
UNITED STATES PATENTS

| 2,789,155 | Marshall et al. | Apr. 16, 1957 |
| 2,875,172 | Caprino | Feb. 24, 1959 |

FOREIGN PATENTS

| 599,097 | Great Britain | Mar. 4, 1948 |